United States Patent
Shah et al.

[15] 3,668,401
[45] June 6, 1972

[54] RADIATION MEASUREMENT SYSTEM WITH AUTOMATIC STANDARDIZATION USING A RATE FEEDBACK SIGNAL

[72] Inventors: Franklin Bong-See Shah; Paul Henry Troutman, both of Columbus, Ohio

[73] Assignee: Industrial Nucleonics Corporation

[22] Filed: Mar. 11, 1970

[21] Appl. No.: 18,541

[52] U.S. Cl. ...............250/83.6 R, 250/43.5 D, 250/83.3 D, 250/83.3 R, 318/616, 318/668
[51] Int. Cl. .....................................G01t 1/18, G01n 23/00
[58] Field of Search....................250/83.3 D, 83.3 R, 43.5 D, 250/83.6 R; 318/616, 668

[56] References Cited

UNITED STATES PATENTS

| | | | |
|---|---|---|---|
| 3,348,046 | 10/1967 | Lloyd | 250/83.3 D |
| 3,171,954 | 3/1965 | Stern | 318/616 X |
| 3,517,284 | 6/1970 | Booth | 318/616 |

*Primary Examiner*—James W. Lawrence
*Assistant Examiner*—Morton J. Frome
*Attorney*—Anderson, Luedeka, Fitch, Even and Tabin, William T. Fryer, III and C. Henry Peterson

[57] ABSTRACT

A radiation measurement system for measuring an absorption-dependent property of a material is employed in a digital process control system. The radiation measurement system includes an automatic standardization system for performing zero and source standardization and a detector for detecting the completion of each standardization mode. A rate feedback signal is derived in each standardization mode to damp the standardizing operation.

23 Claims, 6 Drawing Figures

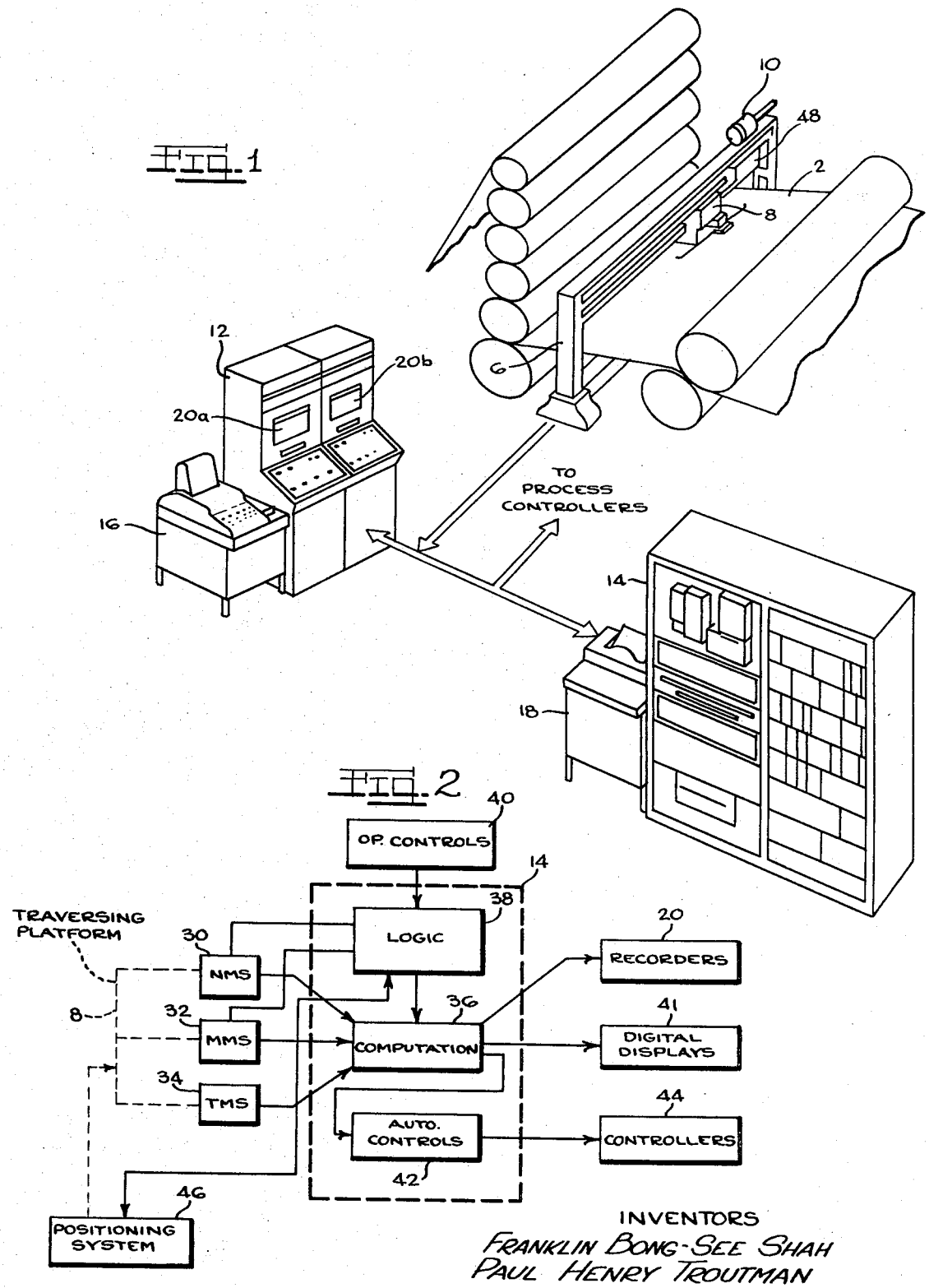

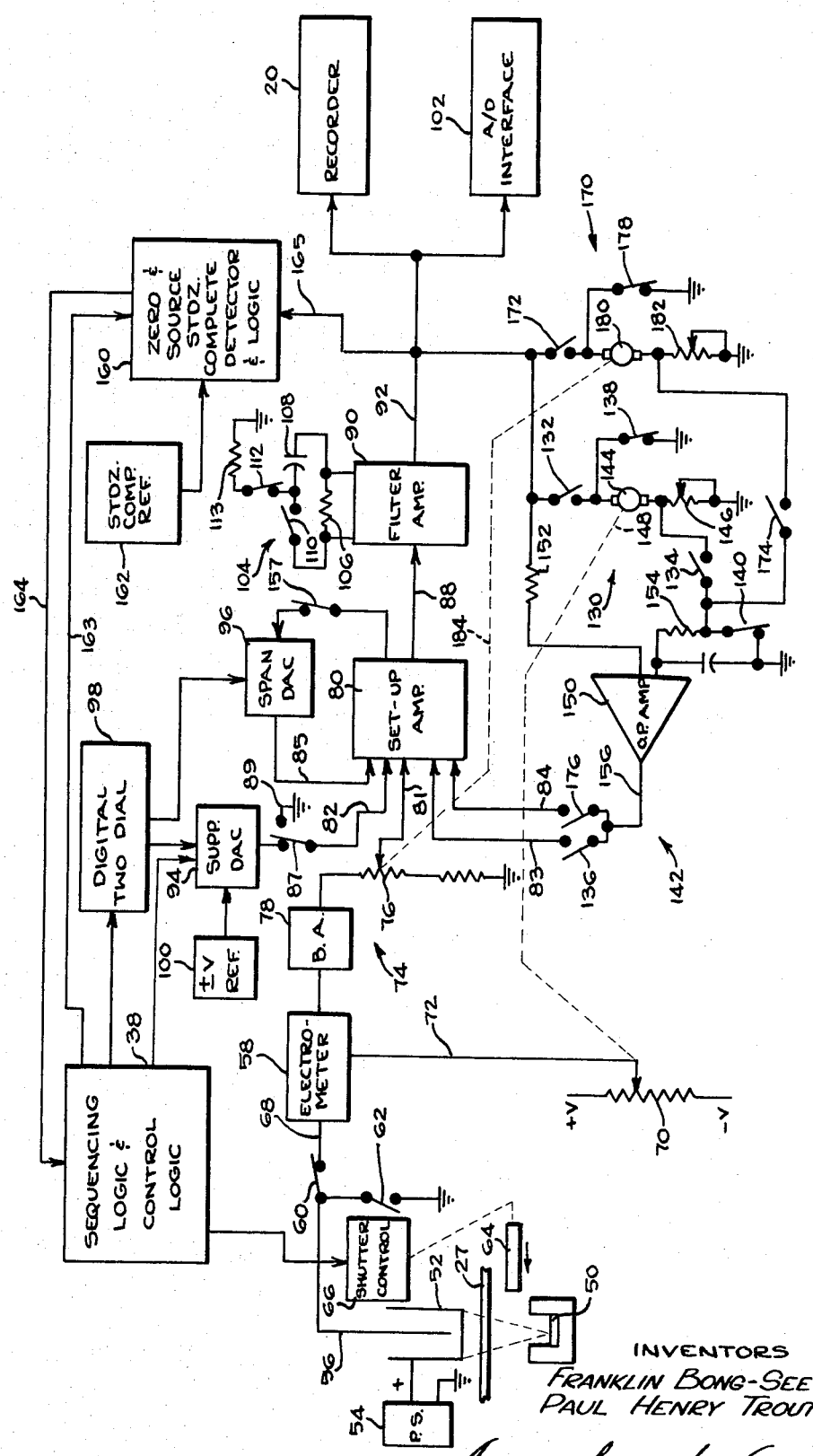

INVENTORS
FRANKLIN BONG-SEE SHAH
PAUL HENRY TROUTMAN

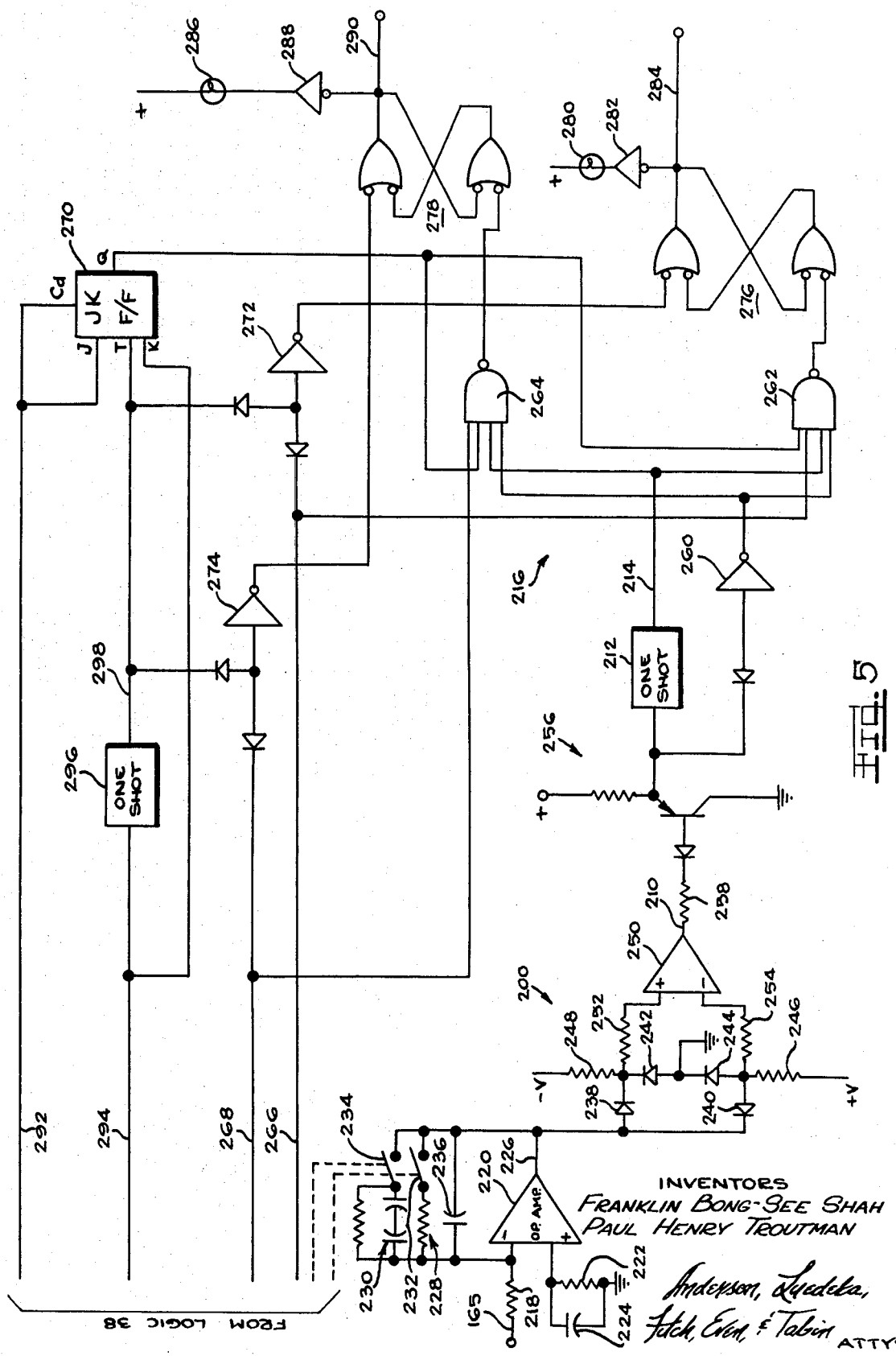

RADIATION MEASUREMENT SYSTEM WITH AUTOMATIC STANDARDIZATION USING A RATE FEEDBACK SIGNAL

The present invention relates to nuclear radiation measurement systems as for measuring an absorption-dependent property or characteristic of a material, and more particularly to a circuit for automatically standardizing such a radiation measurement system. More specifically, the present invention, as herein described, is embodied in a non-contacting beta gauge for continuously measuring the basis weight in a paper manufacturing process, wherein the sheet to be measured is passed between a source of beta rays and radiation detector, and an indication of the basis weight of the sheet or other derived parameter, is presented on a recorder as a function of the relative absorption of the sub-atomic particles by the paper. In addition, the output measurement signal is utilized to control the manufacturing process for automatically maintaining the basis weight of the sheet at a predetermined value or within a predetermined range. Such a system may include auxiliary apparatus to provide for the non-nuclear measurement of other parameters as well, such as moisture content and temperature, which may also be displayed on the recorder or other suitable display apparatus, and which may be employed as a feedback signal to control the process or to provide data for computation ultimately used to control the process.

The automatic standardization system of the present invention may be advantageously employed in a programable or pre-programed digital measurement and control system providing automatic closed-loop control of key variables by processing the signals indicative of the measured parameters through digital computation techniques based on the programed algorithms in addition to direct readout of the parameters to permit operator control of the process. The measurement signals may also be combined through suitable computation techniques with business data to provide condensed, real-time reports of process information suitable for supervisor and management control of production and quality for an entire multiple machine mill, and such an over-all system is compatible with multi-plant and corporate-wide management information systems typically utilizing digital computers.

In such nuclear radiation systems standardization is important to reduce or minimize measurement errors, and in an automatic and computer-controlled system, automatic operation in the standardization and measurement modes is essential. Automatic standardization encompasses the regular or periodic compensation for variations in system parameters which otherwise would cause measurement errors, such standardization being performed automatically to keep the system in calibration.

More particularly, the calibration of such a nuclear gauge depends upon a number of quantitative factors which are subject to variation, and a change in one or more such factors can influence the readings of the nuclear gauge. Such variations in the readings are generally referred to as "drift." One significant source of drift in a nuclear gauge is caused by the progressive decay of the radioactive source, and this is generally referred to as "source drift." As the source decays, the total radiation emission rate is reduced, but the percentage of radiation emitted at any given energy level remains the same, so that the shape of the energy distribution curve of the emitted particles does not change. Other factors may contribute to this type of drift, such as the presence of dust and foreign matter, such as may be present in the process environment, which may build up in the detection path, changes in electrometer gain, and variations in the geometry of the detection path. The geometry may generally be considered constant if suitably rigid supporting structures for the radiation source and detector are provided to maintain constant spacings and reliable and consistent operation.

Further sources of drift, and ones which are independent of the radiation source, are the variations in the voltage levels of the electronic measuring circuitry, and particularly of the electrometer typically employed as a pre-amplifier to convert the low-level d.c. output signal from the radiation detector to an appreciable voltage signal which may be conveniently utilized in the over-all measurement system. Since the electrometer amplifier must be responsive to currents typically in the range of $10^{-12}$ to $10^{-8}$ amperes, it is extremely sensitive to variations in electrical component parameters due to temperature changes and other causes, generally resulting in an offset of the output voltage levels from a particular calibration. Such zero drift is a common problem with d.c. amplifiers.

Thus, the standardization process is one of adjusting, periodically or from time to tome, certain components of the gauge so as to restore or maintain its ability to reproduce the readings for which it was calibrated without requiring any repetition of any part of the calibration procedure. The variations in the electronic component parameters which produce an offset in the output signal from the level to which it was calibrated may be compensated or corrected by a mode of standardization generally termed "zero standardization" which re-establishes the zero-reference level of the measurement system. This is accomplished by providing a zero electrical input to the electrometer and adjusting a reference or bias voltage of the electrometer to establish a zero output signal corresponding to the zero input.

Provision is also made for periodic standardization to correct for the source type drift. This mode of standardization is generally termed "source standardization," and unlike zero standardization, involves the "statistics" or "noise" which is an inherent characteristic of the usual ionization chamber type nuclear gauge. The term "statistics" is used to describe random signal voltage variations which are caused by fluctuating ionization currents occasioned by the statistical nature of radiation detection which produces build-up and decay of ionization upon the random occurence of discrete detection processes or events within the ionization chamber. This may introduce errors in the source standardization.

Automatic standardizing systems heretofore employed in conventional nuclear gauges using ionization chambers typically develop a signal across a load resistor by the flow of ionization current therethrough which is compared to a reference signal. The relative magnitude of the two signals is then varied by means of a standardizing potentiometer which is automatically adjusted by a suitable driving means such as a servo-motor, which attempts to drive the potentiometer to the desired balance point. Since the potentiometer must follow the variations in signal voltage which fluctuate continuously according to the statistics, i.e., in a random or unpredictable manner, except for some smoothing due to the time constant of the measuring circuit, the standardizing potentiometer would be required to hunt back and forth around and about the vicinity of the desired setting. Standardization errors would then occur because the standardizing mode or phase of operation may end at any arbitrary point of time, removing power from the potentiometer drive and allowing the potentiometer adjustment to remain at the setting it happened to occupy at the instant the power was removed. This would be true whether the duration of the source standardization is determined by an electrical timer or some other means.

A prior automatic standardizing system designed to reduce such standardizing errors employs a loosely coupled potentiometer which responds only to deviations outside some predetermined limit.

It is an object of the present invention to provide a radiation measurement system which has an improved method and system for zero and source standardization.

It is another object of the present invention to provide an improved radiation measurement system wherein the zero and source standardizing modes are automatically terminated when each respective standardization has been achieved, and the measurement mode is resumed automatically upon completion of standardization.

It is still another object of the present invention to provide an improved radiation measurement system having means for automatically terminating the source standardizing mode when the system has stabilized sufficiently to provide a predetermined statistical accuracy within the acceptable tolerance of the system.

It is a further object of the present invention to provide an improved standardization method and system for a radiation measurement system which amplifies deviations from a predetermined relation between an adjustable electrometer signal and a reference signal, and rapidly diminishes such deviations to produce said predetermined relation while simultaneously damping the adjustment.

These and other objects and features of the invention are more particularly set forth in the following detailed description and in the accompanying drawings, of which:

FIG. 1 is a pictorial diagram of a digital control system for a paper manufacturing process including a radiation measurement system in accordance with an embodiment of the present invention;

FIG. 2 is a block diagram showing, generally, the functional components of the system of FIG. 1;

FIG. 3 is a schematic diagram of the radiation measurement and control system of FIG. 2 showing the automatic standardizing and related circuits;

FIG. 5 is a schematic diagram of the detector circuit for detecting the completion of the zero and source standardization modes in the system of FIG. 3.

Figure 4:
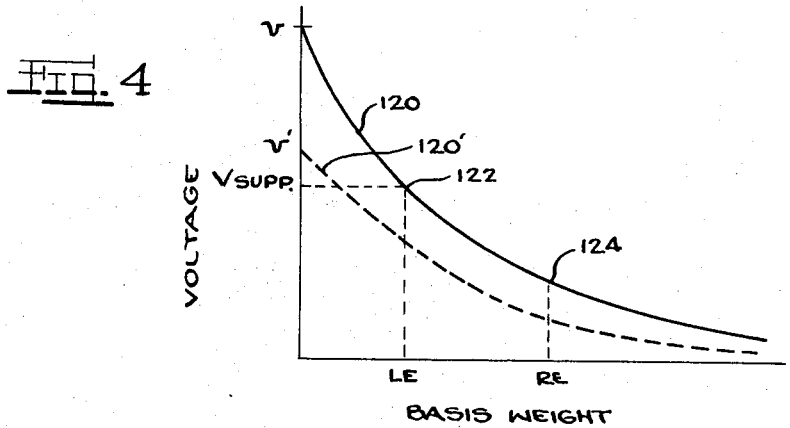
FIG. 4 is a graphical representation of voltage-response curves used to illustrate certain principles relating to the operation of the circuits of FIG. 3.

Referring now to FIG. 1, there is shown a digital system for controlling a paper making process wherein a radiation measurement system is utilized to measure basis weight of the paper sheet 2 as it leaves the dryers to be wound upon a take-up reel. The sheet 2 passes through a transversing structure 6 of the "wide O" type having a traversing platform 8 for moving a nuclear measurement sensor comprising a radiation detector and source (located on opposite sides of the sheet in the illustrated embodiment) across the width of the sheet by means of a motor 10 and a suitable drive assembly. The traversing platform 8 also supports a moisture sensor and temperature sensor as well as the nuclear sensor, and may carry the electrometer pre-amplifier which is responsive to the radiation detector output and certain other circuits desirably located near the sensor. The traversing structure 6 is of heavy construction to provide the necessary rigidity required for consistent alignment of the sensors and the constant geometry of the radiation detector and source.

The measurement signals are fed from the traversing platform assembly to suitable operator consoles 12 and to a suitably programmed digital computer 14 to provide three levels of control for the process. The first is automatic closed-loop control of significant variables by signals proportional to the variants between target and profile averages; the second is operator control at the operator console 12 which has suitable annunciator display panels, recorders, and process adjustment controls; and the third is supervisor and management control based on real-time reports of process information derived from the measured parameters and other data computed in the digital computer 14. The system is adapted to provide production and quality control read-outs for a plurality of machines or processes by appropriate multiplexing. Desired process information may be printed out by conventional automatic typewriters 16 and 18 associated with the operator control console 12 and/or the computer 14. The output signals to the various process controllers may be utilized, for example, for weight control by adjusting appropriate stock valves, and for moisture control by actuating suitable valves controlling dryer steam in the paper manufacturing process.

The recorders 20a and 20b may provide trend and/or profile recordings. The trend recordings presents machine direction variations in profile ranges and averages for basis weight (and moisture content) for each pass of the traversing platform 8 across the sheet 2. The profile recordings chart cross-direction variations in basis weight (and moisture) at selected locations or passes across the sheet 2. By utilizing the signals from the basis weight and moisture measuring sensors, a recording of "dry weight" may also be presented.

FIG. 2 shows a general block diagram of the system of FIG. 1, wherein the traversing platform 8 is indicated by dotted line and supports the nuclear measurement sensor (NMS) 30, the moisture measurement sensor (MMS) 32, and the temperature measurement sensor (TMS) 34. Each of these sensors 30, 32 and 34 supply their respective measurement signals to the computation section 36 of the computer 14. A logic section 38 of the computer is responsive to the operator controls 40 and to various other control signals from the system, and supplies suitable control signals to each of the sensors to control their operation in the various modes of system operation. The logic section 38 also supplies suitable control signals to the computation section 36 to select the pre-programmed computation necessary to provide the desired outputs at recorders 20 and digital displays 41, in addition to appropriately signaling suitable anunciators which may be employed.

The computation section 36 of the computer also supplies the process-derived control signals to an automatic control section 42 which, in turn, provides signals in suitable form to operate the various controllers, indicated by the block 44, for operation of the various valves, etc., in the manufacturing process.

A positioning system 46 is provided to control the movement of the traversing platform 8 in response to appropriate signals from the logic 38 and may provide acknowledge signals to the logic 38 indicative of certain positions of the traversing platform.

In addition to operating the traversing platform 8 in the normal traversing motions in the measurement mode of operation, the positioning system 46 moves the traversing platform 8 to a position 48 (FIG. 1) at the extreme end of the traversing structure 6 so that the radiation source and detector of the nuclear measurement sensor 30 are beyond the edge of the sheet 2, generally referred to as the "off-sheet" position. For reasons which will be discussed in greater detail hereinafter, the off-sheet position of the nuclear measurement sensor assembly is used during the source standardizing mode of system operation.

With reference to the nuclear measurement sensor 30 and the associated components of the nuclear measurement system, reference is now made to FIG. 3. As there is shown, the sheet 2 passes between a source of radiation 50, which may be a beta source such as strontium 90 or carbon 14 or any other beta emitter, and a radiation detector 52 which is a conventional ionization chamber. A high d.c. potential of typically between 300 to 900 volts is applied to the outer electrode of the ionization chamber 52 by any suitable d.c. power supply 54. Radiation reaching the chamber 52 permits a low-level current to flow on output lead 56 to an electrometer 58 through normally closed series input contacts 60. An additional contact 62 which is normally open during the measurement mode of system operation is arranged in shunt with the ionization gauge output on lead 56 to short the output to ground whenever the series or input switch 60 is in its open position for servicing or during the zero standardization mode, as will be discussed in detail hereinafter.

A movable shutter assembly 64 is provided which may be positioned to block the radiation emitted from the source 50 or to pass such radiation to the material and radiation detector 52, the latter position being shown in FIG. 3. The movement of the shutter assembly 64 is controlled by shutter control circuitry 66 in response to appropriate signals from the sequencing and control logic 38 which also provides the actuating signals for the input switch contacts 60 and 62, as well as the various sequencing and control functions of the system.

The nuclear measurement sensor 30, as shown in FIG. 2, comprises the radiation source 50, ionization chamber 52, electrometer 58, switches 60 and 62 and the shutter assembly 64 on the traversing platform 8, as well as the necessary signal and control wiring and power supply leads which connect the sensor 30 to the remainder of the system.

The ionization chamber 52 detects the radiation from the source 50 as influenced by the material 2 by producing a detection signal systematically related to the radiation incident upon the chamber. This detection signal is fed to a first input circuit 68 of the electrometer 58 via the ionization chamber output lead 56. An adjustable source 70 of zeroing signal is coupled to a second input circuit 72 of the electrometer 58. The electrometer 58 provides a varying d.c. signal at the output circuit 74 of the electrometer which is a function of the sum of signals proportional to respective signals applied to the respective first and second electrometer input circuits 68 and 72. The adjustable source of zeroing signal, illustrated as an adjustable potentiometer connected between plus and minus reference voltages, sets the zero reference of the system by setting a suitable bias level for the electrometer 58.

Gain control means 76, illustrated as another potentiometer, is responsive to a voltage signal derived from the electrometer output circuit 74 through a buffer amplifier 78 and controls the relative magnitude of the d.c. electrometer signal which is to be utilized in the system. The electrometer output circuit may be considered to include the buffer amplifier 78 and potentiometer 76.

Summing amplifier means, including set-up amplifier 80, is responsive to multiple input signals at its input terminals 81 through 85 and develops on its output terminal 88 an output signal which is a function of the sum of signals proportional to the respective signals applied to its respective input terminals. The summing amplifier means 80 thus "sets up" the multiple inputs at an internal summing point to provide an output at terminal 88 which is proportional to the algebraic sum. By the term "sum," as used herein, it is understood that the algebraic sum is contemplated so that the result may be either the sum or difference of the signals, depending on the respective signs. It is also understood that the term "d.c. signal" includes varying unidirectional or d.c. voltage, typically varying relatively slowly. The term also encompasses such signals which change in polarity.

The d.c. electrometer signal is applied from the potentiometer wiper or tap to the input 81 of the set-up amplifier 80, and the output of the set-up amplifier at 88 is fed through a filter amplifier 90 to provide an output signal at output terminal 92 of the summing amplifier means. This output signal is indicative of the average radiation received by the ionization chamber 52.

A predetermined zero suppression d.c. reference signal is also applied to the set-up amplifier 80 through input terminal 82 from suppression digital-to-analog converter 94 to establish the signal corresponding to the lowest point on the recorder chart, i.e., lowest point within the measurement range of interest. A variable feedback circuit is coupled to the set-up amplifier 80 through a span digital-to-analog converter 96 which supplies a variable feedback voltage at input terminal 85 to control the gain of the set-up amplifier 80. This, in turn, determines the measurement scale range or span on the recorder chart. Both the suppression and span converters 94 and 96 are controlled by a two dial digital circuit 98 which sets the desired zero suppression and span for the measurement. The suppression converter 94 has a stable voltage reference input 100, of any suitable type, to establish the various d.c. analog output voltage levels from the converter.

The two dial digital circuit 98 is controlled by appropriate signals from the sequencing and control logic 38 or may be controlled by manual dial adjustment to provide the desired digital outputs.

The signal from the filter amplifier 90 at output terminal 92 may then be fed to the recorder 20 and/or to an analog-to-digital interfacing apparatus 102. The interfacing apparatus 102 is utilized to convert the analog output signal to the beta gauge to digital form for supplying the measurement information to the digital computer 14 for process control and digital display as illustrated in FIGS. 1 and 2.

A variable time constant circuit 104 is coupled in a feedback circuit across the filter amplifier 90 to adjustably vary the time base for averaging the output from the set-up amplifier. The time constant circuit 104 comprises a resistor 106 and a capacitor 108 which is connectable in parallel with the resistor by switch 110. Switch 112 when closed connects the capacitor 108 to ground through a resistor 113 in order that the capacitor be fully charged when switched into the feedback circuit, thus minimizing transients. The switches 110 and 112 are controlled by the sequencing and control logic 38 which always maintains one of the switches closed while the other is opened.

The sequencing and control logic 38 operates the system successively in a zero standardizing mode, a source standardizing mode and a measurement mode. Assuming that the system is initially in the measurement mode, and referring to FIG. 4, the system output voltage at terminal 81 corresponding to the signal on the wiper of potentiometer 76 derived from the electrometer 58 may be typically represented by the curve 120 illustrating the voltage as a function of basis weight of the paper sheet 2 being measured. This curve generally follows an exponential function. With the system calibrated and standardized with only air in the detection path the voltage at the potentiometer tap on input 81 to the set up amplifier is shown as v for zero basis weight. Since only a portion of the total characteristic is generally of interest during a given process, the digital two dial circuit 98 may be adjusted or set to cause the suppression digital-to-analog converter 94 to supply a suppression voltage V supp., which suppresses the zero to establish the point indicated as 122 on the curve 120, corresponding to the left edge (LE) of the recorder graph. The span converter 96 is adjusted by the digital two dial 98 to provide an appropriate feedback voltage at input 85 to set the required gain of the amplifier 80 to establish a span or range to point 124 on the curve 120, corresponding to the right edge (RE) of the recorder graph. Thus, during the measurement mode of operation, the output signal on output terminal 92 which is fed to the recorder 20 and the analog-to-digital interfacing apparatus 102 will provide basis weight measurements between the designations LE and RE, whatever they might be for any particular process application. For any particular manufacturing run various zero suppression voltages and various spans might be utilized to establish a measurement parameter range encompassing or bracketing the expected range of variations of the material property being measured, the basis weight of FIG. 4 being given only as a matter of example.

Periodically during the manufacturing process and the operation of the system, the sequencing and control logic 38 initiates the standardization modes of operation. Such initiation may be the result of a clock or other timing means within the system, appropriate pre-programmed instructions from the computer 14, or manual actuation of an operator control. In any event, the means for operating the system in the zero standardizing mode generally comprises adjustable means, illustrated as potentiometer 70, for adjustably varying the source of zeroing signal coupled to the second electrometer input circuit 72, means for applying a zero input signal to the first electrometer input circuit 68, illustrated as the contacts 60 which are opened and the contacts 62 which are closed by the logic 38. Additionally, the logic 38 actuates the shutter control 66 to close the shutter 64 during the zero standardizing mode for reasons of safety. The logic 38 also actuates normally closed switch contacts 87 in the output of converter 94 to a ground contact position 89 to apply a zero input signal on input 82 to the set-up amplifier 80 which is combined with the voltage on input terminal 81 to provide an amplified voltage on output terminal lead 92 corresponding to the deviation between the two input voltages. Alternatively, however, the digital two dial 98 may automatically set the suppression converter 94 to apply a zero input signal on the input terminal 82.

The logic 38 causes a first feedback means 130 to be coupled to the output terminal lead 92 of the summing amplifier means by closing normally open contacts 132, 134 and 136 and opening normally closed contacts 138 and 140. The first feedback means 130 is responsive to the output signal on lead 92 and adjusts the zeroing potentiometer 70 in the direction reducing the output signal on output terminal 92. Additionally, a rate feedback means 142 is provided for supplying a rate feedback signal to the input terminal 83 of the set-up amplifier 80 corresponding to the rate of the adjustment of the potentiometer 70. More specifically, the first feedback means 130 comprises a d.c. servo-motor 144 connected from the output terminal 92 in series with a variable calibration resistor 146 to ground. Thus, the voltage appearing across the motor will cause the shaft 148 to rotate the move the wiper of potentiometer 70. The motor will rotate at a speed proportional to the applied voltage in a direction reducing the output signal and will provide an integration over time to supply a position feedback control signal to the potentiometer 70.

The rate feedback means 142 comprises a differential operational amplifier 150 having two input terminals connected in shunt across the terminals of the servo-motor 144 through coupling resistors 152 and 154, respectively. The variable calibration resistor 146 is adjusted to compensate for the motor armature resistance so that the back EMF of the motor develops across the motor terminals, and the differential amplifier thus develops at its output terminal 156 a rate feedback signal generally proportional to the difference in the signals as applied to the respective differential amplifier input terminals.

The rate feedback signal in the zero-standardizing mode is coupled through closed contact 136 to the input terminal 83 of the set-up amplifier 80 with a sense so as to oppose or damp the movement of the motor shaft, and thus the adjustment of the potentiometer 70. Deviations in the voltage at the tap of potentiometer 76 from the zero reference on input 82 to the set-up amplifier 80 are amplified by the maximum gain provided by the set-up amplifier 80 so that the largest error signal practicable is produced at the output terminal 92. This causes the servo-motor 144 to adjust the potentiometer 70 with the greatest initial velocity, while simultaneously, the rate feedback means 142 damps the velocity of the motor to prevent hunting or overshooting of the desired position and assures the stabilizing of the potentiometer in the shortest time.

The high gain in the set-up amplifier is accomplished by cutting out the span feedback converter 96 by opening normally closed switch contacts 157, or alternatively, by a suitable digital input from the digital two dial circuit 98. In either case, this result is in response to a control signal from the logic 38 accompanying operation in the zero-standardization mode. The rate feedback permits the use of a high gain or high amplifier factor in the summing and subsequent amplifier stages for the greatest sensitivity, while at the same time avoiding "jump starts" due to the static friction and inertia of the motor.

When the output signal at output terminal 92 is below a predetermined level which is considered sufficiently close to zero to be within the acceptable tolerance of the measurement system for a predetermined time, this condition is detected by zero and source standardize complete detector and logic 160 which is responsive to the output signal at terminal 92. The detector 160 has a standardize complete reference voltage fed thereto from a source 162 to establish the predetermined reference level for the zero-standardization mode. A control signal is fed to the detector 160 via line 163 from logic 38 to indicate whether the system is in the zero or source standardization modes so that the "zero condition" or "dead band" can be appropriately established for each mode. Consequently, when the error voltage deviation at output terminal 92 is below the predetermined level (i.e., in the dead band) for the predetermined time, the detector 160 supplies a zero-standardization-complete signal to the sequencing and control logic 38 via line 164. This automatically causes the logic 38 to switch its outputs to the pre-programmed conditions corresponding to the source-standardization mode of system operation.

The means for operating the system in the source standardizing mode comprises generally means for moving the radiation source and detector relative to the material to subject a standard material, such as air (which has or can be made to have a constant absorption characteristic), to the radiation from the source 50, such means being illustrated as the positioning system 46 in FIG. 2 which moves the traversing platform 8 to the "off-sheet" position 48, as illustrated in FIG. 1, in response to an appropriate signal from the logic 38. The logic 38 also actuates the input switches 60 and 62 to the first electrometer input circuit 68, closing the series switch 60 and opening the shunt switch 62, thereby applying the ionization current from ionization chamber output lead 56 to the first input circuit 68 of the electrometer. At the same time the shutter assembly is moved to its open or radiation passing position by the shutter control 66 in response to another signal from the logic 38. This operation takes place when the traversing platform 8 is in the off-sheet position. Standardization may be most conveniently accomplished, as previously indicated, by standardizing with air in the detection path, but with suitable modifications in the circuit, other standard materials may be alternatively employed.

The electrometer gain control potentiometer 76 which adjusts the gain of the electrometer signal derived from the electrometer 58 through the buffer amplifier 78 is automatically adjusted during the source standardization mode in the manner hereinafter described.

The control logic 38 provides a disabling signal to the digital two dial circuit 98 and a digitally coded source-standardizing voltage to the suppression digital-to-analog converter 94 so that it applies a standardize reference signal $v$, as shown in FIG. 4, to the input terminal 82 of the set-up amplifier 80. The switch contacts 157 are retained in their previous open condition which keeps the span digital-to-analog converter 96 out of the feedback circuit so that the set-up amplifier 80 will have its maximum gain, as it did in the zero-standardization mode. Of course, if the two dial circuit 98 were utilized for these functions instead of logic controlled switches 87 and 157, then no disabling of the digital two-dial 98 would be employed.

Referring back to FIG. 4, it is assumed that the system has been previously calibrated with a source of radiation providing the characteristic curve 120. At some later time and with the potentiometer 76 left in its previously standardized position, source decay or other variations may result in a shift to a characteristic curve 120' for the same material. The new curve 120' represents a proportional shift from the original curve 120. With "no absorber material" (i.e., only air) in the detection path, the deviation produced by the summing amplifier produces a highly amplified error signal on output terminal lead 92 indicative of the deviation between the voltage $v$ and the new voltage $v'$.

Second feedback means 170 is responsive to the error signal at output terminal 92 when the control logic 38 closes the normally open switches 172, 174 and 176 and opens the normally closed switch 178. The logic 38 maintains the normally closed switch contact 140 in its open position from the zero standardization mode, opens the normally open switches 136, 134 and 132 and closes the normally closed contact 138. The second feedback means 170 is similar in construction to the first feedback means 130 and comprises a d.c. servo-motor 180 having its terminals connected in series with a further variable calibration resistor 182 between the output terminal 92 and ground. The source-standardization servo-motor 180 has its shaft 184 coupled to the adjustable electrometer gain potentiometer 76. The second feedback means 170 adjusts the electrometer gain control potentiometer in the direction to establish a predetermined relation, preferably equal and opposite magnitudes, between the electrometer signal fed to the set-up amplifier at input terminal 81 and the source standardize reference voltage on input terminal 82 at which the output signal at output terminal 92 approaches zero.

The rate feedback means 142 provides a rate feedback signal in the source-standardization mode as it did in the zero-standardization mode, but now it corresponds to the rate of adjustment of the gain control potentiometer 76. The variable calibration resistor 182 is adjusted to compensate for the motor armature resistance and develops the motor back EMF across the terminals of the source standardization servo-motor 180. This voltage is then coupled between the positive and negative inputs of the differential amplifier 150 through the coupling resistors 152 and 154, and the output of the differential amplifier 150 is applied through the now closed switch contacts 176 to the input terminal 84 of the set-up amplifier. Separate input terminals 83 and 84 may be employed, as illustrated, for the zero and source standardizing rate feedback signals, since each may require a different summing resistor within the input circuit of the set-up amplifier 80 to establish the proper weighting factor. It is also possible to apply the signals to the same terminal during the respective standardizing operations, if the weighting factor selection is performed elsewhere in the system.

The high-gain and rate feedback provision in the source standardization mode of operation provide all the advantages previously described in connection with the zero-standardization mode of operation, and in addition, they minimize the errors due to the statistics of the source while completing standardization in a minimum amount of time for a given accuracy. The deviations from the predetermined relation at the set-up amplifier input are amplified and rapidly diminished to produce, or to re-establish, the predetermined relation while simultaneously damping the adjustment of the potentiometer 76. This re-establishes the calibration represented by the curve 120.

Because of the effects of statistics, or gauge noise, the output signal at output terminal 92 will not be constant but will be fluctuating, and these fluctuations are fed to the standardize complete detector and logic circuit 160 via lead 165. The detector 160 provides a source standardize complete signal on output lead 164 when the output signal on output terminal 92 is below a predetermined level for more than a predetermined time.

Upon detecting the completion of the source standardization mode, the detector 160 provides a signal to the logic 38 which then automatically returns the system to its measurement mode previously described, and returns the various switches to their normal position which disconnects the standardization feedback circuits from the system and places the span converter back into the feedback circuit of setup amplifier 80.

More particularly, referring now to FIG. 5, there is shown a schematic diagram of the zero and source standardizing complete detector and logic circuit 160 of FIG. 3. Generally, the detector 160 comprises a comparator 200 for comparing the magnitude of the output signal on output terminal 92 and fed to the detector 160 via lead 165 with a threshold reference signal established by the plus and minus d.c. voltage of the standardize comparator reference voltage source 162 (FIG. 3) applied to the comparator 200. The threshold reference voltages provide the predetermined level within the comparator 200 for establishing the dead band or range in which an error signal is considered to be within the acceptable tolerance of the system. The comparator 200 provides a comparator output signal of one d. c. level at terminal 210 when the signal on lead 165 is within the dead band established by the comparator, and provides a signal of a different d.c. level when the signal on lead 165 is outside the dead band. A monostable multivibrator or "one shot" 212 is responsive to the comparator signal at terminal 210 by generating an enabling signal at its output terminal 214 only if the comparator signal remains at the first d.c. level for a predetermined period of time, determined by the time constant of the multivibrator 212. Logic means, generally indicated as 216, is responsive to the comparator signal and to the output of the multivibrator to provide a standardize complete signal only on coincidence of a comparator signal of the first mentioned d.c. level and an enabling signal from the multivibrator.

More specifically, the output signal from the filter amplifier 90 on lead 165 is fed through a coupling resistor 218 to the negative terminal of an operational differential amplifier 220, the positive input terminal of which is connected to ground through resistor 222 and shunt filter capacitor 224. The operational amplifier 220 amplifies the signal on lead 165 and provides an output signal at its output terminal 226. Two switchable feedback branches 228 and 230 are connected across the negative input terminal and the output terminal of the amplifier 220. Each of the feedback branches is selectively placed into the circuit to determine the gain of the amplifier, each branch being engaged and disengaged by switch contacts 232 and 234 controlled from the logic 38, as indicated in dotted line. The feedback circuit 228 adjusts the gain of the amplifier 220 the appropriate amount to provide the proper signal amplitude relation to the comparator levels for the zero standardization mode, and the feedback branch 230 adjusts the gain of amplifier 220 the appropriate amount to provide the proper signal amplitude relation to the comparator levels for the source standardization mode. An additional feedback branch formed by capacitor 236 is common to both modes. Thus, during zero standardization, switch contacts 232 are closed and contacts 234 are opened, while during source standardization switch contacts 234 are closed and contacts 232 are open. This permits the use of a single comparator to detect the completion of both standardizing operations.

After the signal has been amplified by the proper gain factor, it is fed to the comparator 200 formed by a diode bridge comprising diodes 238, 240, 242 and 244 and having the reference voltages V and −V applied to the opposite terminals of the bridge at the anode of diode 244 and the cathode of diode 242 through voltage dropping resistors 246 and 248 respectively. The bridge is coupled to the positive and negative terminals of another differential amplifier 250 through respective coupling resistors 252 and 254, respectively. In a preferred embodiment of the illustrated system, the comparator 200 provides a dead band of 1.2 volts.

The output of the differential amplifier 250 is coupled through a coupling resistor 258 to a voltage buffer 256 for isolating the voltage levels at the output of the amplifier 250 from the voltage levels of the logic at the output of the buffer. The buffer 256 comprises a PNP transistor emitter-follower circuit which supplies a logical zero output whenever the signal being fed to the detector 160 is within the dead band, and a logical one output whenever the signal is outside of the dead band. The output of the buffer 256 is fed to both the input of the monostable multivibrator 212 and to an inverter 260. The output on lead 214 from the multivibrator is fed to a zero-standardize NAND gate 262 and to source-standardize NAND gate 264. The output from the inverter 260 is fed to second inputs of these same NAND gates.

Leads 266 and 268 supply zero-standardize and source-standardize initiate signals from the logic 38, and each is respectively connected to a third input of the NAND gates 262 and 264 and actuates the appropriate one depending on which standardizing mode the system is operating in.

A fourth input to each of NAND gates 262 and 264 is supplied from the Q output of a conventional J-K flip-flop circuit 270 which is provided for maintaining the NAND gates 262 and 264 disabled until an appropriate time for actuation to prevent undesired triggering by spurious transients which may be present on the system leads, and this flip-flop is operated by control signals from the logic 38 in a manner described below. The logic input signals on leads 266 and 268 are also fed through inverters 272 and 274 to reset flip-flops 276 and 278 respectively associated with the zero and source standardization complete signals. The output from the NAND gates 262 and 264 provide triggering signals for setting respective flip-flops 276 and 278. A zero-standardize incomplete light 280 is coupled to the output of the flip-flop 276 through an inverter 282, and the zero standardizing complete signal is provided at output lead 284 going back to the logic 38 upon completion, but otherwise indicates that the zero standardization is incomplete. Likewise, a source-standardize incomplete lamp 286 is coupled to the output of the flip-flop 278 through an inverter 268 to signal when source-standardization is complete, and the source standardization complete signal is supplied on lead 290 to the logic 38 in the same manner as previously described in respect to zero standardization.

Figure 6:
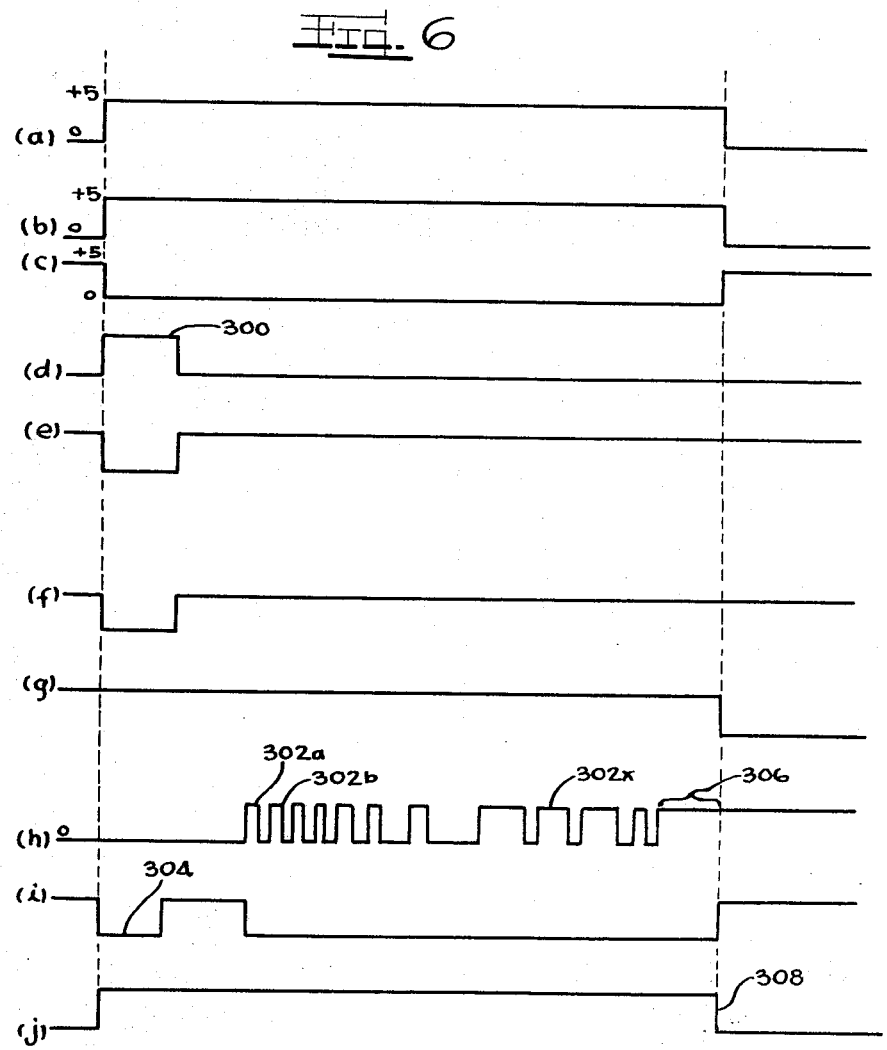
FIG. 6 is a timing diagram showing the operation of the standardization completion detector and logic of FIG. 5.

The operation of the circuit may be more clearly understood with reference to the diagrams of FIG. 6 wherein FIG. 6a illustrates the change in voltage level on lead 266 on the initiation of zero-standardization. This voltage is applied to an input of NAND gate 262 to signify that the system is in the zero-standardization mode. The other NAND gate 264 will be inherently disabled during this mode. This change in voltage level on zero initiate lead 266 resets the flip-flop 276, causing the voltage level on flip-flop output terminal 284 to go to its one or high state and the output of the inverter 282 to go to its zero state, illuminating the lamp 280 to signify that zero standardization is in progress.

Simultaneously, another signal, illustrated in FIG. 6b, is supplied on lead 292 from the logic 38, and this is identical to the voltage level change on zero initiate lead 266, but is applied to the J terminal and the clear direct ($C_d$) terminal on the J-K flip-flop 270. A still further signal or change in voltage level, illustrated in FIG. 6c, is applied on lead 294 from the logic 38 to a one shot 296 and to the K input of the flip-flop 270. The signal level on lead 294 is the inverse of that appearing on lead 292. Thus the signal on lead 292 assures that the output of the flip-flop 270 at Q is in its low state until it is triggered at terminal T. The output of the one-shot on lead 298 is in the form of a pulse 300 as shown in FIG. 6d which is fed to the trigger terminal T of the flip-flop 270 and on termination gates or transfers the high or one state of the J terminal to the Q output terminal of the flip-flop 270. Since the K terminal was at a low or zero level, this zero appears at the input to NAND gate 262 for the period of the duration of the one-shot pulse 300, typically being about 0.7 seconds. Upon the termination of the pulse 300, the Q terminal goes to its one state which enables the NAND gate 262. At the same time, the termination of the pulse 300 is fed through the inverter 272 to apply a zero to the reset terminal of the flip-flop 276 to permit it to operate when it is subsequently actuated by the NAND gate 262. The Q output signal waveform of the flip-flop 270 is illustrated in FIG. 6e and is the inverse of the one-shot output shown in FIG. 6d. The removal of the reset pulse on the flip-flop 276 is illustrated by the waveform in FIG. 6f. FIG. 6g illustrates the one or high zero-standardize incomplete signal from the NAND gate 262 which is fed to the input of the zero-standardize flip-flop 276.

The dead band crossover pulses produced at the output of inverter 260 are illustrated in FIG. 6h, each pulse 302a, 302b, etc., representing a period of time during which the signal fed to the detector 160 is within the dead band established by the comparator. FIG. 6i illustrates the output of the one-shot on lead 214, showing that it goes from its one state to its zero state when it is triggered by a zero-going pulse from the voltage buffer 256. At this time the one-shot output remains in its zero state so long as it continues to be triggered before it has a chance to rise back to its one state, i.e., as long as it receives triggering pulses within the time-constant of the circuit. Since the pulses 302a, 320b, etc., are all spaced within the time-constant of the one shot, typically being 0.36 seconds, the one-shot output level stays in its zero condition. Thus, the time constant of the one shot determines the amount of time that the output signal on output terminal 92 (FIG. 3) must remain within the dead band to signify that the standardization is complete.

After the period indicated as 306, the amplitude variations of the output signal on terminal 92 have remained within the dead band for duration at least as long as the time constant of the one shot, and with this condition satisfied, the one-shot output is allowed to return to its one state. Now there is coincidence of all of the inputs to the NAND gate 262, which are in their one state, and the NAND gate output goes to its zero state as indicated in FIG. 6g. This triggers the flip-flop 276, producing a zero standardization complete signal 308 on lead 284 as shown in FIG. 6j, and turning off the incomplete lamp 280.

It may be noted that one-shot 212 is often triggered by a switching transient upon initiation of a standardization mode. This causes a pulse as shown at 304, FIG. 6(i) even though the output signal on terminal 92 has not entered the deadband.

The operation of the detector 160 with respect to the source-standardization complete is practically identical to that just described, and it is considered that no further description is necessary for an understanding of its operation. However, it should be noted that the requirement that the signal fed to the detector remain within the deadband for a preselected or predetermined period of time is especially significant in connection with the source-standardization mode where the signal is continuously fluctuating according to the statistical variations of the detected ionization current.

It is, of course, understood that all of the relay switching contacts illustrated and described may be controlled by the logic 38 by conventional relay drive circuits and by conventional techniques well-known in the art. Further, all of the control switching may be performed by electronic means if desired, and the various logic circuits may be replaced by other logic circuits to perform the same overall functions in the system.

Various modifications of the present invention will be apparent to those skilled in the art; and accordingly, the invention is defined only by the claims and equivalents thereof.

Various features of the invention are set forth in the following claims.

What is claimed is:

1. A method of standardizating a radiation gauge having an electrometer for providing a d.c. electrometer signal, comprising the steps of additively combining said electrometer signal with a d.c. reference signal to produce an output signal which is a function of the sum of signals proportional to respective combined signals, adjusting the electrometer signal derived from said electrometer in the direction to establish a predetermined relation between said electrometer signal and said reference signal at which said output signal approaches zero, and generating a standardizing complete signal when the output signal is below a predetermined level for more than a predetermined time.

2. A method of standardizing a radiation gauge having an electrometer for providing a d.c. electrometer signal, the steps of additively combining said electrometer signal with a d.c. reference signal and a rate feedback signal to produce an output signal which is a function of the sum of signals proportional to respective combined signals, adjusting the electrometer signal derived from said electrometer in the direction to establish a predetermined relation between said electrometer signal and said reference signal at which said output signal approaches zero, and providing as said rate feedback signal a signal corresponding to the rate of said adjusting, whereby deviations from said predetermined relation are amplified and rapidly diminished to produce said predetermined relation while simultaneously damping the adjusting.

3. The method of claim 2 wherein a standardizing complete signal is generated when the output signal is below a predetermined level.

4. The method of claim 2 wherein a standardizing complete signal is generated when the output signal is below a predetermined level for more than a predetermined time.

5. A method of zero standardizing a radiation gauge having an ionization chamber for detecting radiation by producing a detection signal systematically related to the radiation incident upon the chamber, and an electrometer providing a d.c. electrometer signal which is a function of the sum of signals proportional to respective signals applied to respective first and second electrometer input circuits, wherein said detection signal is normally applied to the first of said input circuits and a zeroing signal is applied to the second of said input circuits, said method comprising the steps of grounding the output of said radiation detector while disconnecting the detection signal from said first input circuit, additively combining said electrometer signal with a d.c. reference signal and a rate feedback signal to produce an output signal which is a function of the sum of signals proportional to respective combined signals, adjusting the zeroing signal in the direction reducing said output signal to zero, and providing as said rate feedback signal a signal corresponding to the rate of said adjusting, whereby deviations from said predetermined relation are amplified and rapidly diminished to produce said predetermined relation while simultaneously damping the adjusting.

6. A method of source standardizing a radiation gauge having a source of nuclear radiation for irradiating material a property of which is to be measured, an ionization chamber for detecting said radiation as influenced by said material by producing a detection signal systematically related to the radiation incident upon said chamber, and an electrometer having an input circuit coupled to said detector and an output circuit providing a d.c. electrometer signal systematically related to said detection signal, said method comprising the steps of additively combining said electrometer signal with a d.c. reference signal and a rate feedback signal to produce an output signal which is a function of the sum of signals proportional to respective combined signals, adjustably varying the gain of said electrometer in the absence of said material to vary the electrometer signal in the direction to establish a predetermined relation between said electrometer signal and said reference signal at which said output signal approaches zero, and providing as said rate feedback signal a signal corresponding to the rate of said adjustment, whereby deviations from said predetermined relation are amplified and rapidly diminished to produce said predetermined relation while simultaneously damping the adjustment.

7. A method of operating a radiation measurement system having a source of nuclear radiation for irradiating a material a property of which is to be measured, an ionization chamber for detecting said radiation as influenced by said material by producing a detection signal systematically related to the radiation incident upon said chamber, an electrometer having first and second input circuits and an output circuit, an adjustable source of zeroing signal coupled to said second input circuit of said electrometer, said electrometer providing a d.c. electrometer signal at said electrometer output circuit which is a function of the sum of signals proportional to respective signals applied to the respective first and second electrometer input circuits, gain control means for controlling the relative magnitude of said d.c. electrometer signal, summing amplifier means developing on its output terminal an output signal which is a function of the sum of signals proportional to respective signals applied to its respective first, second and third input terminals, and means applying said d.c. electrometer signal to said first input terminal, said method for operating said system comprising successively zero standardizing, source standardizing and measuring, A. said zero standardizing comprising applying a zero input signal to said first electrometer input circuit, applying a zero reference signal to said second input terminal of said summing amplifier, adjusting said source of zeroing signal in response to said output signal in the direction reducing said output signal, applying a rate signal coresponding to the rate of said adjusting to reduce said rate, and upon said output signal being less than a predetermined level for at least a predetermined time switching the system to its source standardizing mode, B. said source standardizing comprising moving said radiation source and detector relative to the material to subject a standard material to said radiation, applying said detection signal to said first electrometer input circuit, applying a source standardize reference signal to said second input terminal, adjusting said gain control means in response to said output signal in the direction to establish a predetermined relation between said electrometer signal and said source standardize reference signal at which said output signal approaches zero, applying a second rate signal coresponding to the rate of adjustment of said gain control means to reduce said rate, and upon said output signal being less than a predetermined level for at least a predetermined time switching the system to its measuring mode, C. said measuring comprising moving said radiation source and detector relative to the material to subject the material to said radiation, applying said detection signal to said first electrometer input circuit, applying a zero suppression d.c. reference signal to said second input terminal, and utilizing said output signal as an indication of the material property being measured.

8. The method of claim 7 wherein said system is zero standardized periodically.

9. The method of claim 7 wherein the gain of summing amplifier means is made greater during zero and source standardizing than during measuring.

10. A standardization circuit for a radiation gauge including an electrometer for providing a d.c. electrometer signal, comprising summing amplifier means having first, second and third input terminals and an output terminal, said summing amplifier means developing on the output terminal an output signal which is a function of the sum of signals proportional to respective signals applied to the respective first, second and third input terminals, adjustable means for adjustably varying the electrometer signal derived from said electrometer, which electrometer signal is coupled to said first input terminal, a d.c. reference signal coupled to said second input terminal, first feedback means coupled to said output terminal and responsive to said output signal for adjusting said adjustable means in the direction to establish a predetermined relation between said electrometer signal and said reference signal at which said output signal approaches zero, and further feedback means for providing a rate feedback signal to said third input terminal corresponding to the rate of said adjustment, whereby deviations from said predetermined relation are amplified and rapidly diminished to produce said predetermined relation while simultaneously damping the adjustment of said adjustable means.

11. The circuit of claim 10 wherein said adjustable means comprises a potentiometer, said first feedback means comprises a servo-motor connected to the output of said amplifier means and mechanically coupled to said potentiometer, said motor driving the potentiometer in the direction to establish a zero voltage output from said summing amplifier means, and said further feedback means comprises circuit means for sensing the back EMF of said motor and applying a voltage generally proportional thereto to said third input terminal.

12. The circuit of claim 11 wherein said circuit means comprises a resistance in series circuit relation with said motor to develop the motor back EMF across said motor, and a differential amplifier having two input terminals and an output terminal, said two differential amplifier input terminals being coupled across the motor and said output terminal being coupled to said third input terminal of said summing amplifier means, said differential amplifier developing on the differential amplifier output terminal a rate feedback signal generally proportional to the difference in the signals as applied to the respective differential amplifier input terminals.

13. The circuit of claim 10 comprising detector means coupled to the output terminal of said summing amplifier means and responsive to the output signal thereat for providing a standardizing complete signal when the output signal is below a predetermined level.

14. The circuit of claim 10 comprising detector means coupled to the output terminal of said summing amplifier means and responsive to the output signal thereat for providing a standardizing complete signal when the output signal is below a predetermined level for more than a predetermined time.

15. A standardization circuit for a radiation gauge including an electrometer for providing a d.c. electrometer signal, comprising summing amplifier means having first, second and third input terminals and an output terminal, said summing amplifier means developing on the output terminal an output signal which is a function of the sum of signals proportional to respective signals applied to the respective first, second and third input terminals, a potentiometer for adjustably varying the electrometer signal derived from said electrometer, which electrometer signal is coupled to said first input terminal, a d.c. reference signal coupled to said second input terminal, first feedback means coupled to said output terminal and responsive to said output signal for adjusting said potentiometer in the direction to establish a predetermined relation between said electrometer signal and said reference signal at which said output signal approaches zero, and further feedback means for providing a rate feedback signal to said third input terminal corresponding to the rate of said adjustment, whereby deviations from said predetermined relation are amplified and rapidly diminished to produce said predetermined relation while simultaneously damping the adjustment of said potentiometer.

16. In a radiation gauge including a source of nuclear radiation for irradiating material a property of which is to be measured, an ionization chamber for detecting said radiation as influenced by said material by producing a detection signal systematically related to the radiation incident upon said chamber, and an electrometer having first and second electrometer input circuits and an electrometer output circuit, selectively operable means for applying said detection signal to said first input circuit, an adjustable source of zeroing signal coupled to said second input circuit, said electrometer providing a d.c. electrometer signal at said electrometer output circuit which is a function of the sum of signals proportional to respective signals applied to the respective first and second electrometer input circuits, a zero standardizing circuit comprising summing amplifier means having first, second and third input terminals and an output terminal, said summing amplifier means developing on the output terminal an output signal which is a function of the sum of signals proportional to respective signals applied to the respective first, second and third input terminals, a potentiometer for adjustably varying said source of zeroing signal, thereby varying said electrometer signal being coupled to said first input terminal, d.c. reference signal coupled to said second input terminal, first feedback means coupled to said output terminal and responsive to said output signal for adjusting said potentiometer in the direction to establish a predetermined relation between said electrometer signal and said reference signal at which said output signal approaches zero, and further feedback means for providing a rate feedback signal to said third input terminal corresponding to the rate of said adjustment.

17. In radiation gauge including a source of nuclear radiation for irradiating material a property of which is to be measured, an ionization chamber for detecting said radiation as influenced by said material by producing a detection signal systematically related to the radiation incident upon said chamber, and an electrometer having an input circuit coupled to said detector and an output circuit providing a d.c. electrometer signal systematically related to said detection signal, a source standardization circuit comprising summing amplifier means having first, second and third input terminals and an output terminal, said summing amplifier means developing on the output terminal an output signal which is a function of the sum of signals proportional to respective signals applied to the respective first, second and third input terminals, a potentiometer connected in the electrometer output circuit for adjustably varying said electrometer signal in the absence of said material, which electrometer signal is coupled to said first input terminal, a d.c. reference signal coupled to said second input material, first feedback means coupled to said output terminal in the absence of said material in said gauge and responsive to said output signal for adjusting said potentiometer in the direction to establish a predetermined relation between said electrometer signal and said reference signal at which said output signal approaches zero, and further feedback means for providing a rate feedback signal to said third input terminal corresponding to the rate of said adjustment, whereby deviations from said predetermined relation are amplified and rapidly diminished to produce said predetermined relation while simultaneously damping the adjustment of said potentiometer.

18. A standardization circuit for a radiation gauge including an electrometer for providing a d.c. electrometer signal, comprising summing amplifier means having first, second and third input terminals and an output terminal, said summing amplifier means developing on the output terminal an output signal which is a function of the sum of signals proportional to respective signals applied to the respective first, second and third input terminals, adjustable means for adjustably varying the electrometer signal derived from said electrometer, which electrometer signal is coupled to said first input terminal, a d.c. reference signal coupled to said second input terminal, feedback means coupled to said output terminal and responsive to said output signal for adjusting said adjustable means in the direction to establish a predetermined relation between said electrometer signal and said reference signal at which said output signal approaches zero, and detector means coupled to the output terminal of said summing amplifier means and responsive to the output signal thereat for providing a standardizing complete signal when the output signal is below a predetermined level for more than a predetermined time.

19. The circuit of claim 18 wherein said detector means comprises a comparator for comparing the magnitude of said output signal with a threshold reference signal having said predetermined level and providing a comparator signal when said output signal is below said predetermined level, a monostable multivibrator responsive to said given comparator signal for generating an enabling signal only if said comparator signal extends for said predetermined period of time, logic means coupled to said comparator and to said multivibrator for providing a standardization complete signal only on coincidence of said comparator signal and said enabling signal.

20. A radiation measurement system comprising a source of nuclear radiation for irradiating a material a property of which is to be measured, an ionization chamber for detecting said radiation as influenced by said material by producing a detection signal systematically related to the radiation incident upon said chamber, an electrometer having first and second input circuits and an output circuit, an adjustable source of zeroing signal coupled to said second input circuit of said electrometer, said electrometer providing a d.c. electrometer signal at said electrometer output circuit which is a function of the sum of signals proportional to respective signals applied to the respective first and second electrometer input circuits, gain control means for controlling the relative magnitude of said d.c. electrometer signal, summing amplifier means having first, second and third input terminals and an output terminal, said summing amplifier means developing on its output terminal an output signal which is a function of the sum of signals proportional to respective signals applied to its respective first, second and third input terminals, means applying said d.c. electrometer signal to said first input terminal, and means for operating said system successively in a zero standardizing mode, a source standardizing mode and a measurement mode, A. said means for operating said system in the zero standardizing mode comprising first adjustable means for adjustably varying said source of zeroing signal coupled to said second electrometer input circuit, means for applying a zero input signal to said first electrometer input circuit, means for applying a zero reference signal to said second input terminal of said summing amplifier, first feedback means coupled to said output terminal and responsive to said output signal for adjusting said adjustable means in the direction reducing said output signal, and first rate feedback means for providing a first rate feedback signal to said third input terminal corresponding to the rate of said adjustment of said first adjustable means, B. said means for operating said system in the source standardizing mode comprising means for moving said radiation source and detector relative to the material to subject a standard material to said radiation, means for applying said detection signal to said first electrometer input circuit, a source standardize d.c. reference signal, means for coupling said source standardize reference signal to said second input terminal, second feedback means coupled to said output terminal and responsive to said output signal for adjusting said gain control means in the direction to establish a predetermined relation between said electrometer signal and said source standardize reference signal at which said output signal approaches zero, and second rate feedback means for providing a second rate feedback signal to said third input terminal corresponding to the rate of adjustment of said gain control means, and C. said means for operating said system in the measuring mode comprising means for moving said radiation source and detector relative to the material to subject the material to said radiation, said detection signal being applied to said first electrometer input circuit, a predetermined zero suppression d.c. reference signal, means for coupling said zero suppression reference signal to said second input terminal, and means coupled to said output terminal and responsive to said output signal to provide a signal indicative of the material property being measured.

21. The system of claim 20 comprising detector means coupled to the output terminal of said summing amplifier means and responsive to the output signal thereat for providing a standardizing complete signal when the output signal is below a predetermined level for more than a predetermined time while the system is in a standardizing mode, and means responsive to a standardizing complete signal for advancing the system to the next successive mode.

22. The system of claim 21 comprising means for periodically placing the system in the zero standardizing mode.

23. The system of claim 20 further including a span control comprising further gain control means for controlling the gain of said summing amplifier means, and means for adjusting said further gain control means to provide substantially greater gain in said summing amplifier means in said zero and source standardizing modes than in said measuring mode.

* * * * *